United States Patent Office 3,549,689
Patented Dec. 22, 1970

---

3,549,689
PHENOXY-ALKANOIC ACIDS
Albert J. Frey, Essex Fells, Rudolf G. Griot, Florham Park, and Hans Ott, Convent Station, N.J., assignors to Sandoz-Wander, Inc., Hanover, N.J., a corporation of Delaware
No Drawing. Filed May 23, 1967, Ser. No. 640,465
Int. Cl. C07c 103/22
U.S. Cl. 260—471          39 Claims

ABSTRACT OF THE DISCLOSURE

The compounds are α - (o - benzamidophenoxy)-lower alkanoic acids, e.g., 2 - [4-chloro-2-(p-chlorobenzamido)-phenoxy]-isobutyric acid. They are useful as anti-inflammatories. They are prepared by benzoylating an o-aminophenol to form the corresponding o-benzamidophenol, which is then condensed with a suitable α-halo-lower alkanoic acid alkyl ester to form the corresponding α-(o-benzamidophenoxy)-lower alkanoic acid alkyl ester, which is then hydrolyzed to its acid.

---

This invention relates to phenoxy-alkanoic acids and more particularly to α - (o - benzamidophenoxy) - lower alkanoic acids and processes for their preparation. The invention also relates to intermediates in the preparation of said α - (o - benzamidophenoxy) - lower alkanoic acids, and to processes for the preparation of said intermediates.

The α - (o - benzamidophenoxy) - lower alkanoic acids of this invention have the formula:

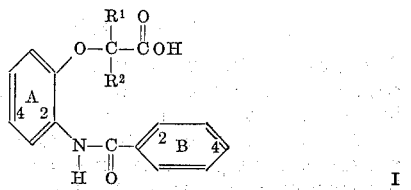

wherein $R^1$ is a member selected from the group consisting of a hydrogen atom and methyl;
$R^2$ is alkyl having 1 or 2 carbon atoms, i.e. methyl or ethyl;
Ring A is unsubstituted or substituted by a single member selected from the group consisting of methyl, chloro (—Cl), methoxy, nitro(—$NO_2$), amino(—$NH_2$), acetamido(—$NHCOCH_3$) or sulfo($SO_3H$);
Ring B is unsubstituted or substituted by one or two members which are selected independently from the group consisting of nitro, trifluoromethyl(—$CF_3$), halo having an atomic weight of from 19 to 35, i.e. fluoro or chloro, alkyl having from 1 to 4 carbon atoms, e.g. methyl, ethyl, propyl and butyl, and alkoxy having from 1 to 4 carbon atoms, e.g., methoxy, ethoxy, propoxy and butoxy, with the proviso that a plurailty of trifluoromethyl groups are not ortho to each other.

It is preferred that Ring B be substituted in the 3-, 4 or 3- and 4-positions.

Compounds I are obtained according to the following reaction scheme A, wherein $R^1$, $R^2$, Ring A and Ring B are as defined above, X is halo having an atomic weight of 35 to 127, i.e. chloro, bromo or iodo, and $R_3$ is lower alkyl, e.g., having from 1 to 6 carbon atoms, such as methyl, ethyl, propyl, butyl, amyl or hexyl, preferably methyl or ethyl.

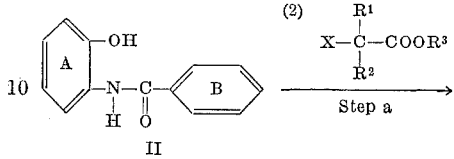

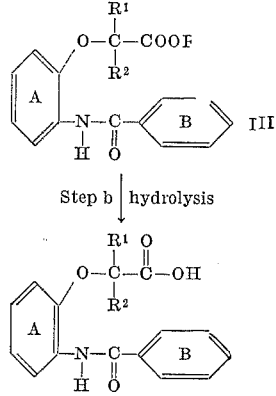

According to reaction scheme A, in Step (a) the desired compound III is formed from a suitable compound II. In Step (a), first the compound II is converted to its alkali metal phenolate by conventional means, preferably by admixing a compound II with a strong alkali metal base under anhydrous conditions in a suitable solvent at from 15° to 35°. Preferably the compound II is added to NaH in N,N - dimethylacetamide (DMA) or N,N - dimethylformamide (DMF), or $NaOCH_3$ in DMA or $CH_2Cl_2/CH_3OH$, at an initial temperature of from 5° to 15°, until addition is complete, then the temperature of the reaction mixture is raised to from 15° to 35°, e.g., 20°. The alkali metal phenolate of a compound II is then condensed with an $R^3$-ester of an α-halo-lower alkanoic acid, e.g., ethyl 2-bromoisobutyrate, under anhydrous conditions in a suitable solvent, e.g., DMA, at a temperature of from 0° to 60°. The condensation usually requires from 0.5 to 4 hours. It is preferred to carry out the two parts of Step (a) sequentially without recovering the alkali metal phenolate of the compound II and reacting it in situ with the α-halo ester to form the corresponding compound III.

In Step (b) the compound III is hydrolyzed to its acid, i.e. the corresponding compound I, by convention means. Preferably the compound III is admixed with a strong base, e.g., an aqueous alkali hydroxide solution, in the presence of an inert co-solvent, e.g., dioxane, acetone, or DMA, at a temperature of from 20° to 60°, preferably at 20° to 30°, as higher temperatures may lead to the disadvantageous hydrolysis of the amido bond. The hydrolysis usually requires from 1 to 20 hours. The resultant compound I may be recovered as a salt, e.g., the sodium salt, or the alkaline reaction medium acidified and the compound I recovered therefrom as the free acid. Preferably 5% to 100% excess of the alkali hydroxide, is used, based on the molarity of the ester, i.e. compound III.

Compounds II are known or may be obtained by adaptation of known methods for preparing their known analogs, e.g., according to the procedure described by R. Adams and J. M. Stewart in the Journal of the American Chemical Society, volume 74, pages 5876 to 5880 (1952).

In general, compounds II may be prepared by acylating a suitable 2-aminophenol (compound IV) with a suitable benzoyl chloride or bromide (compound V) according to the following reaction scheme B wherein Ring A and Ring B are as defined above and Q is chloro or bromo.

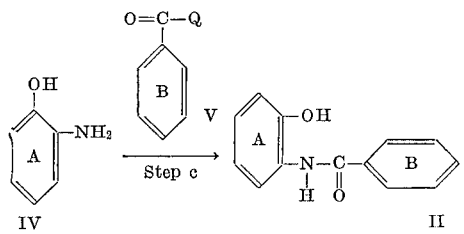

Step (c) is an acylation which is effected in the presence of a tertiary amine, e.g., pyridine or triethylamine, in an equivalency of at least that of the compound V, under anhydrous conditions at a temperature of from 0° to 60°, e.g., 20°. The amine may be used in excess to also serve as a solvent or an inert co-solvent may be used, e.g., dioxane, acetone, DMA, DMF or dimethylsulfoxide (DMSO). It is preferred to maintain a temperature of 0° to 10° while admixing compounds IV and V. The reaction time of the acylation is usually from 1 to 20 hours.

Since both the hydroxyl and amino-positions of compound IV are susceptible to acylation, the acylation may not proceed selectively on the amino group as desired, depending to a large degree on the nature or position of any substituent on the Ring A. In instances where diacylation undesirably has occurred yielding a benzoate ester of an o-benzamidophenol, such as diacylated product may be converted to the corresponding compound II by selective hydrolysis of its ester function by conventional means. For example, the crude reaction mixture of Step (c) may be admixed with excess NaOH and the mixture allowed to stand at room temperature to assure substantial converssion to the desired compound II. Alternatively Step (c) can be carried out under Schotten-Baumann conditions, i.e., in the presence of an excess of aqueous alkali hydroxide to keep the reaction mixture strongly alkaline during the whole acylation reaction.

Compounds I in which $R^1$ is different from $R^2$, can exist as a racemate or in an optically active form. The racemic form as well as the optical antipodes (enantiomers) of such compounds I are within the scope of this invention. Resolution of a racemate of a compound I may be effected by conventional means, e.g., by the use of optically active bases. In some cases greater pharmacological activity or other beneficial attribute may be found with respect to a particular antipode, and in such instances administration of such antipode may be preferred.

All compounds I are useful because they possess pharmacological activity in animals. In particular, they are all useful as anti-inflammatories. The dosage administered will, of course, vary depending upon the compound and mode of administration. However, in general, satisfactory results are obtained when administered to mammals either orally or parenterally in daily doses of from 2 to 10 mg./kg. of body weight, e.g., for large mammals from 50 to 600 milligrams per diem, preferably administered in doses of from 25 to 150 milligrams, two to four times per diem.

Compounds I may also be used in the form of their non-toxic pharmaceutically acceptable salts, and such salts are within the scope of this invention. Thus the compounds, in either their free acid form or in the form of non-toxic pharmaceutically acceptable salts may be admixed with conventional pharmaceutical carriers or diluents and administered, e.g., in the same manner as phenylbutazone, i.e. 4-butyl-1,2-diphenyl-3,5-pyrazolidinedione. Representative of non-toxic pharmaceutically acceptable salts are the non-toxic alkali metal salts, e.g., potassium and sodium salts, the non-toxic alkaline earth metal salts, e.g., calcium salts, the ammonium salts and salts of the non-toxic organic bases, e.g., ethanolamine salts.

Each of the pharmacologically active compounds of this invention may be incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD-30 and purified water. An exemplary tabletting formulation for the intsant active compounds is:

| | Parts |
|---|---|
| Title compound of Example 1 | 25 |
| Tragacanth | 2 |
| Lactose | 64.5 |
| Corn starch | 5 |
| Talcum | 3 |
| Magnesium stearate | 0.5 |
| Alcohol SD-30, purified water q.s. | |

Examples illustrative of this invention follow. Throughout this disclosure all temperatures are centigrade (room temperature is 20°) and all percents are by weight, unless specified otherwise.

wherein Ar is as aforesaid with a compound of the formula

HO—R—OH

EXAMPLE 1

2-[4-chloro-2-(p-chlorobenzamido)-phenoxy]-isobutyric acid

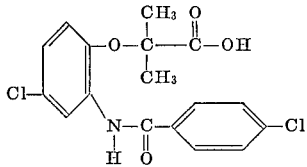

(a) 4-chloro-2-(p-chlorobenzamido)-phenol

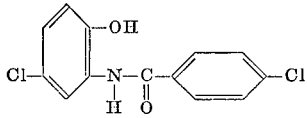

Dissolve 143.6 grams (g.) (1.0 mole) of 2-amino-4-chlorophenol in 750 milliliters (ml.) of dry N,N-dimethylacetamide (DMA) and add thereto 119 g. (1.5 moles) of dry pyridine. Add to the mixture 192.5 g. (1.1 moles) of p-chlorobenzoyl chloride dropwise, with stirring and cooling in an ice bath at such a rate that the reaction temperature does not exceed 10°. Maintain stirring for 16 hours at room temperature. Evaporate the reaction mixture under vacuum at 60° to obtain an oily residue. Dissolve the resulting oily residue in 2 liters of ethyl acetate and wash twice with 1 liter portions of water. Separate the ethyl acetate solution, dry it over magnesium sulfate, filter and evaporate the filtrate to dryness under vacuum. Dissolve the resulting residue in 1 liter of acetone and treat with activated carbon, then filter while hot and cool to room temperature. Add gradually an equal amount of water to obtain compound (a), i.e. 4-chloro-2-(p- chlorobenzamido)-phenol as light yellow crystals, M.P. 196° to 202°.

(b) 2-[4-chloro-2-(p-chlorobenzamido)-phenoxy]-isobutyric acid ethyl ester

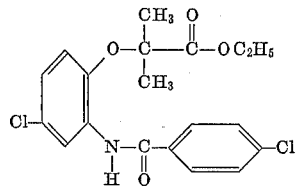

Suspend 10.6 g. (0.22 mole) of sodium hydride (50% in mineral oil) in 750 ml. of dry DMA, and add dropwise thereto 56.4 g. (0.2 mole) of purified compound (a) in 250 ml. of dry DMA, with stirring in an ice bath, at such a rate that the reaction temperature does not exceed 15°. Maintain stirring of the solution at room temperature for 2 hours, then add thereto 45 g. (0.24 mole) of ethyl 2-bromo-isobutyrate and continue stirring at room temperature for 16 hours. Raise the temperature of the reaction mixture to 60° (for one hour), then evaporate under vacuum to obtain an oily residue. Take up the obtained residue in 1 liter of methylene chloride and wash twice with 250 ml. portions of 2 N aqueous sodium hydroxide. Separate the methylene chloride solution, dry over magnesium sulfate, filter and evaporate under vacuum to obtain a residue. Crystallize compound (b), i.e. 2-[4-chloro-2-(p - chlorobenzamido)-phenoxy]-isobutyric acid ethyl ester from diethyl ether-petroleum ether (1:1), M.P. 85° to 86°.

(c) 2-[4-chloro - 2 - (p-chlorobenzamido)-phenoxy]-isobutyric acid.—Dissolve 7.2 g. of compound (b) in a mixture of 60 ml. of methanol and 40 ml. of 2 N aqueous sodium hydroxide and allow the resultant mixture to stand at 20° for 17 hours. Evaporate under vacuum to remove most of the methanol, acidify the residue with 45 ml. of 2 N hydrochloric acid, then extract thrice with methylene chloride (50 ml. portions). Dry the combined methylene chloride extracts over sodium sulfate, filter and evaporate the filtrate, under vacuum, to dryness. Crystallize from diethyl ether to obtain the title compound, i.e. 2-[4-chloro-2-(p-chlorobenzamido)-phenoxy]-isobutyric acid white prisms, M.P. 160° to 162°.

EXAMPLE 2

2-[2-(p-chlorobenzamido)-phenoxy]-isobutyric acid

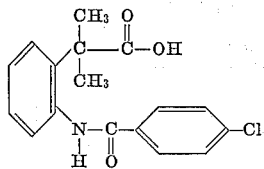

(a) 2-(p-chlorobenzamido)-phenol

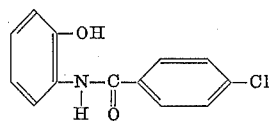

Dissolve 32.7 g. of 2-aminophenol in 400 ml. of dry dioxane and 100 ml. of dry pyridine. Over a period of 10 minutes at room temperature add thereto in small portions a solution of 57.8 g. of p-chlorobenzoyl chloride in 50 ml. of dry dioxane, and allow the reaction mixture to stand at room temperature for 15 hours. Then add to the reaction mixture 100 ml. of water, and allow to stand at room temperature for 30 minutes to precipitate by-product (white crystals). Filter to remove the by-product, concentrate the filtrate to 200 ml. by evaporating under vacuum, add thereto 200 ml. of 2 N hydrochloric acid, and extract thrice with 200 ml. portions of methylene chloride. Dry the combined extracts over sodium sulfate, filter and evaporate under vacuum to obtain crude 2-(p-chlorobenzamido)-phenol, i.e. compound (a). Recrystallize from acetone-water (1:1) to obtain purified compound (a), M.P. 178° to 180°.

(b) 2-[2 - (p - chlorobenzamido)-phenoxy]-isobutyric acid ethyl ester.—Dissolve 7.44 g. of purified compound (a) in 50 ml. of methylene chloride and 50 ml. of methanol. Dissolve 0.77 g. of sodium in 50 ml. of methanol (to form a methanolic solution of $CH_3ONa$). Slowly admix the two solutions at such a rate that the temperature of the mixture does not exceed 15°, then evaporate to dryness under vacuum to obtain a residue. Dissolve the residue in 120 ml. of dry DMA, add dropwise over a period of 10 minutes a solution of 4.4 g. of ethyl 2-bromo-isobutyrate in 20 ml. of dry DMA, and allow the mixture to stand at room temperature for 3½ hours. Then remove most of the DMA by evaporating under vacuum. Dissolve the resulting residue in 100 ml. of methylene chloride and wash twice with 40 ml. portions of 1 N aqueous sodium hydroxide; dry the methylene chloride solution over sodium sulfate, filter, evaporate under vacuum to obtain compound (b), i.e. 2-[2-(p-chlorobenzamido)-phenoxy]-isobutyric acid ethyl ester as a yellow oil.

(c) 2-[2-(p-chlorobenzamido) - phenoxy] - isobutyric acid.—Dissolve 7.2 g. of compound (b) in 60 ml. of methanol and 40 ml. of 2 N aqueous sodium hydroxide and allow the mixture to stand at room temperature for 17 hours. Remove substantially all of the methanol from the reaction mixture by evaporating under vacuum. Acidify the aqueous residue with 50 ml. of 2 N hydrochloric acid, and extract thrice with 80 ml. portions of methylene chloride. Dry the combined methylene chloride extracts over sodium sulfate, filter, concentrate the filtrate to 30 ml. and add thereto 30 ml. of diethyl ether to precipitate the title compound, i.e. 2-[2-(p-chlorobenzamido)-phenoxy]-isobutyric acid, white crystals, M.P. 162° to 163°.

Following the procedure described in part (a) of this example but using, in place of the 2-aminophenol and the p-chlorobenzoyl chloride, the compounds specified in Table I, below, as compounds IV and V respectively, the corresponding benzamidophenols specified as compounds II in the table are prepared. Replacement is on a mole per mole basis.

TABLE I

| IV | Run | V | II |
|---|---|---|---|
| 2-aminophenol | A | o-Chlorobenzoyl chloride | 2-(o-chlorobenzamido)-phenol M.P.185° to 187°; from $CH_2Cl_2$. |
| 2-amino-p-chlorophenol | B | 3,4-dichlorobenzoyl chloride | 4-chloro-2-(3,4-dichlorobenzamido)-phenol M.P. 239° to 240°; from acetone-water (1:1). |
| Do | C | m-Chlorobenzoyl chloride | 4-chloro-2-(m-chlorobenzamido)-phenol M.P. 222° to 223°; from ethyl acetate-diethyl ether (1:4). |
| Do | D | p-Fluorobenzoyl chloride | 4-chloro-2-(p-fluorobenzamido)-phenol M.P. 232° to 234°; from $CH_2Cl_2$-diethyl ether (1:2). |

Following the procedure described in parts b and c of this example but using in place of the 2-(p-chlorobenzamido)-phenol, the compounds (specified in Table II below, as compounds II), the corresponding 2-(o-benzamidophenoxy)-isobutyric acids (specified in the table as compounds I) are obtained. The ethyl esters of each of the specified compounds I are obtained as oils, except for ethyl-2 - [4-chloro - 2 - (3,4-dichlorobenzoylamido)-phenoxy]-isobutyrate (Run B), melting point 105° to 106°; from ethanol. The replacements are on a mole per mole basis.

TABLE I

| II | Run | I |
|---|---|---|
| 2-(o-chlorobenzamido)-phenol | A | 2-[2-(p-chlorobenzamido)-phenoxy]-isobutyric acid, M.P. 186° to 188°; from diethyl ether. |
| 4-chloro-2-(3,4-dichlorobenzamido)-phenol | B | 2-[4-chloro-2-(3,4-dichlorobenzamido)-phenoxy]-isobutyric acid, M.P. 180° to 185°; from water. |
| 4-chloro-2-(m-chlorobenzamido)-phenol | C | 2-[4-chloro-2-(m-chlorobenzamido)-phenoxy]-isobutyric acid, M.P. 151°; from water. |
| 4-chloro-2-(p-fluorobenzamido)-phenol | D | 2-[4-chloro-2-(p-fluorobenzamido)-phenoxy]-isobutyric acid, M.P. 172°; from water. |
| 2-benzamidophenol* | E | 2-(2-benzamidophenoxy)-isobutyric acid, M.P. 148° to 150°; from water. |

*A known compound.

EXAMPLE 3

2-[4-chloro-2-(p-chlorobenzamido)-phenoxy]-propionic acid (racemate)

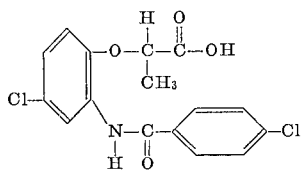

(a) 2-[4-chloro - 2 - (p-chlorobenzamido) - phenoxy]-propionic acid ethyl ester.—Following the general procedure described in Example 2, part (b), dissolve 28.2 g. of 4-chloro-2-(p-chlorobenzamido)-phenol obtained as described in Example 1, part (a) in 150 ml. of methanol and 150 ml. of methylene chloride and add slowly thereto 2.6 g. of sodium dissolved in 100 ml. of methanol. Evaporate the reaction mixture to dryness, under vacuum, dissolve the resultant residue in 300 ml. of dry DMA, add thereto 24 g. of ethyl 2-bromopropionate in 50 ml. of dry DMA and allow the mixture to stand at room temperature for 15 hours. Recover compound (a), i.e. 2-[4-chloro-2-(p-chlorobenzamido)-phenoxy] - propionic acid ethyl ester as described in Example 2, part (b), then recrystallize it from petroleum ether to obtain white crystals, M.P. 65° to 68°.

(b) 2-[4-chloro-2-(p-chlorobenzamido)-phenoxy]-propionic acid (racemate).—Following the general procedure described in Example 2, part (c), dissolve 37 g. of purified compound (a) in 150 ml. of methanol and 200 ml. of 1 N aqueous sodium hydroxide and allow to stand for 1 hour at room temperature. Remove substantially all of the methanol by evaporating under vacuum at 30° acidify the residue with 2 N hydrochloric acid to precipitate the crude title compound. Recrystallize it from methylene chloride-diethyl ether (1:5) to obtain the purified title compound, M.P. 185° to 187°.

Following the general procedure described in this example, but using 4-chloro-2-(3,4-dichlorobenzamido)-phenol, described in Table I, Run B above, in an equivalent amount in place of the 4-chloro-2-(4-chlorobenzamido)-phenol the corresponding compound I is obtained, i.e. 2-[4-chloro-2-(3,4-dichlorobenzamido)-phenoxy]-propionic acid (racemate), M.P. 172° to 177°; from ethanol-water (1:4).

EXAMPLE 4

2-[2-(p-chlorobenzamido)-phenoxy]-propionic acid (racemate)

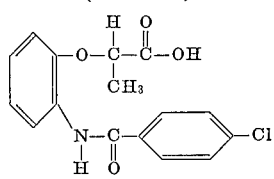

Following the general procedure described in Example 2, part (b), 7.44 g. of 2-(p-chlorobenzamido)-phenol (obtained as described in Example 2, part (a) in 50 ml. of methylene chloride and 50 ml. of methanol) is converted to its sodium salt by adding thereto a solution of 1.8 g. of sodium methoxide in 50 ml. of methanol followed by evaporation of the solvents in vacuum. The sodium salt is reacted with 8.1 g. of ethyl 2-bromopropionate to form 2-[2-(p-chlorobenzamido)-phenoxy]-propionic acid ethyl ester, which is recovered crude as yellow oil. 10 g. of the crude 2-[2-(p-chlorobenzamido)-phenoxy]-propionic acid ethyl ester is hydrolyzed in 50 ml. of ethanol and 50 ml. of 2 N aqueous sodium hydroxide at room temperature for 18 hours, the crude title compound is recovered and recrystallized from ethylene chloride-diethyl ether (1:2) to obtain the purified title compound, M.P. 158° to 160°.

EAMPLE 5

2-[2-(3,4-dichlorobenzamido)-phenoxy]-isobutyric acid

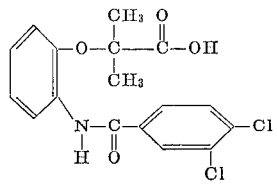

(a) 2 - (3,4-dichlorobenzamido) - phenol.—Following the general procedure of Example 2, part (a), to 27 g. of 2-aminophenol in 70 ml. of dry pyridine and 300 ml. of dry dioxane add over a period of 15 minutes 105 g. of 3,4-dichlorobenzoyl chloride in 100 ml. of dioxane at room temperature. Allow the mixture to stand for 1 hour at room temperature. Then add 2 liters of ice water to precipitate crude 3,4-dichlorobenzoate ester of o-(3,4-dichlorobenzamido)-phenol, which is then dissolved in 800 ml. of dioxane and 280 ml. of 2 N aqueous sodium hydroxide, and stirred for 1 hour at room temperature. Acidfy this reaction mixture with 300 ml. of 6 N hydrochloric acid to precipitate crude compound (a), i.e. 2-(3,4-dichlorobenzamido)-phenol and recrystallize it from methylene chloride-ethanol (1:2), M.P. 192° to 194°.

(b) 2-[2-(3,4 - dichlorobenzamido)-phenoxy]-isobutyric acid.—Form the sodium salt of compound (a) by admixing 8.5 g. of compound (a) in 150 ml. of methylene chloride and 100 ml. of dry methanol with 0.77 g. of sodium in 50 ml. of methanol. Recover the resultant sodium salt of compound (a) and react it with 8.8 g. of ethyl 2-bromo-isobutyrate to form crude 2-[2-(3,4-dichlorobenzamido)-phenoxy]-isobutyric acid ethyl ester (a yellow oil).

Hydrolyze 9 g. of crude 2-[2-(3,4-dichlorobenzamido)-phenoxy]-isobutyric acid ethyl ester in 100 ml. methanol and 25 ml. of 2 N aqueous sodium hydroxide for 1½ hours at room temperature and recover the crude title compound, which then recrystallize from diethyl ether, M.P. 172°.

Following the general procedure described in this example but replacing the ethyl 2-bromo-isobutyrate with an equivalent amount of ethyl 2-bromopropionate results in the preparation, in a similar manner, of the corresponding compound I, i.e. 2-[2-(3,4-dichlorobenzamido)-phenoxy]-propionic acid (racemate), crystallized from diethyl ether, M.P. 164° to 165°.

EXAMPLE 6

Optical antipodes of 2-[4-chloro-2-(p-chlorobenz-amido)-phenoxy]-propionic acid

This example illustrates the separation of a racemic compound I into its optical antipodes.

Dissolve 16.65 g. of racemic 2-[4-chloro-2-(p-chlorobenzamido)-phenoxy]-propionic acid (racemate) and 22.5 g. of brucine in 120 ml. of methanol and seed the obtained solution with the corresponding brucine salt of $[\alpha]_{546}^{20} = +64°$ (c.=0.8 in chloroform). After 1 hour at 20° filter off the white crystals obtained. Dissolve 5.75 g. of these crystals in 50 ml. of methylene chloride and extract twice with 20 ml. of 2 N aqueous sodium hydroxide. Collect the aqueous layers and acidify them with 20 ml. of 5 N hydrochloric acid to precipitate (+) 2-[4-chloro-2-(p - chlorobenzamido)-phenoxy]-propionic acid as white needles, M.P. 180° to 182°, $[\alpha]_{645}^{20} = +88°$ (c.=0.8 in ethanol).

Evaporate the above filtrate of the (+)-brucine salt to dryness under vacuum, dissolve the obtained residue in 200 ml. of methylene chloride and extract this solution twice with 50 ml. of 2 N aqueous sodium hydroxide. Collect the aqueous phases and acidify them with 50 ml. of 5 N hydrochloric acid to precipitate crude (−) 2-[4-chloro-2-(p - chlorobenzamido)-phenoxy]-propionic acid. For further purification dissolve 10 g. of this product in 100 ml. of hot ethanol. On cooling down to 20° a small amount of essentially racemic material crystallizes out which is filtered off. Concentrate the resulting clear filtrate to a volume of 80 ml. to obtain on crystallization (−) 2-[4-chloro-2-(p - chlorobenzamido)-phenoxy]-propionic acid, M.P. 179° to 181, $[\alpha]_{546}^{20} = -81°$ (c.=0.9 in ethanol).

What is claimed is:

1. A compound of the formula

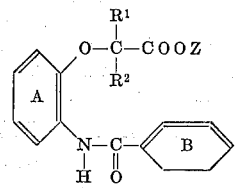

wherein
Z is a hydrogen atom or alkyl having from 1 to 6 carbon atoms;
$R^1$ is a hydrogen atom or methyl;
$R^2$ is alkyl having 1 or 2 carbon atoms;
ring A is unsubstituted or substituted by a single chloro; and
ring B is unsubstituted or substituted by one or two members selected independently from the group consisting of halo having an atomic weight of from 19 to 35.

2. A compound according to claim 1 wherein Z is a hydrogen atom.

3. The compound according to claim 2 which is 2-[4-chloro-2-(p-chlorobenzamido)-phenoxy]-isobutyric acid.

4. The compound according to claim 2 which is 2-[2-(p-chlorobenzamido)-phenoxy]-isobutyric acid.

5. The compound according to claim 2 which is 2-[2-(o-chlorobenzamido)-phenoxy]-isobutyric acid.

6. The compound according to claim 2 which is 2-[4-chloro - 2 - (3,4-dichlorobenzamido)-phenoxy]-isobutyric acid.

7. The compound according to claim 2 which is 2-[4-chloro-2-(m-chlorobenzamido)-phenoxy]-isobtyric acid.

8. The compound according to claim 2 which is 2-[4-chloro-2-(p-fluorobenzamido)-phenoxy]-isobutyric acid.

9. The compound according to claim 2 which is 2-(2-benzamidophenoxy)-isobutyric acid.

10. The compound according to claim 2 which is 2-[4-chloro-2-(p-chlorobenzamido) - phenoxy] - propionic acid (+).

11. The compound according to claim 2 which is 2-[4-chloro-2-(p-chlorobenzamido) - phenoxy] - propionic acid (−).

12. The compound according to claim 2 which is 2-[4-chloro-2-(3,4 - dichlorobenzamido) - phenoxy] - propionic acid.

13. The compound of claim 2 which is 2-[2-(p-chlorobenzamido)-prenoxy]-propionic acid.

14. The compound of claim 2 which is 2-(3,4-dichlorobenzamido)-phenoxy]-isobutyric acid.

15. The compound of claim 2 which is 2-[2-(3,4-dichlorobenzamido)-phenoxy]-propionic acid.

16. A compound according to claim 1 wherein Z is alkyl.

17. The compound according to claim 16 which is 2-[4-chloro-2-(p-chlorobenzamido)-phenoxy] - isobutyric acid ethyl ester.

18. The compound according to claim 16 which is 2-[2-(p-chlorobenzamido)-phenoxy]-isobutyric acid ethyl ester.

19. The compound according to claim 16 which is 2-[2-(o-chlorobenzamido)-phenoxy]-isobutyric acid ethyl ester.

20. The compound according to claim 16 which is 2-[4-chloro - 2 - (3,4-dichlorobenzamido)-phenoxy]-isobutyric acid ethyl ester.

21. The compound according to claim 16 which is 2-[4-chloro-2-(m-chlorobenzamido)-phenoxy] - isobutyric acid ethyl ester.

22. The compound according to claim 16 which is 2-[4-chloro-2-(p-fluorobenzamido) - phenoxy] - isobutyric acid ethyl ester.

23. The compound according to claim 16 which is 2-(2-benzamidophenoxy)-isobutyric acid ethyl ester.

24. The compound according to claim 16 which is 2-[4-chloro - 2 - (p-chlorobenzamido)-phenoxy]-propionic acid ethyl ester.

25. The compound according to claim 16 which is 2-[4-chloro - 2 - (3,4-dichlorobenzamido)-phenoxy]-propionic acid ethyl ester.

26. The compound according to claim 16 which is 2-[2-(p-chlorobenzamido)-phenoxy-propionic acid ethyl ester.

27. The compound according to claim 16 which is 2-[2-(3,4-dichlorobenzamido)-phenoxy] - isobutyric acid ethyl ester.

28. The compound according to claim 16 which is 2-[2-(3,4-dichlorobenzamido)-phenoxy] - propionic acid ethyl ester.

29. A compound of the formula:

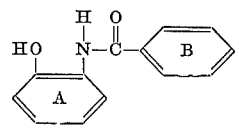

wherein
ring A is unsubstituted or substituted by a single chloro; and
ring B is substituted by one or two members selected independently from the group consisting of halo having an atomic weight of from 19 to 35.
chloro-2-(p-chlorobenzamido)-phenol.

31. The compound according to claim 29 which is 2-(p-chlorobenzamido)-phenol.

32. The compound according to claim 29 which is 2-(o-chlorobenzamido)-phenol.

33. The compound according to claim 29 which is 4-chloro-2-(m-chlorobenzamido)-phenol.

34. The compound according to claim 29 which is 4-chloro-2-(3,4-dichlorobenzamido)-phenol.

35. The compound according to claim 29 which is 4-chloro-2-(p-fluorobenzamido)-phenol.

36. The compound according to claim 29 which is 2-(3,4-dichlorobenzamido)-phenol.

37. A compound of the formula:

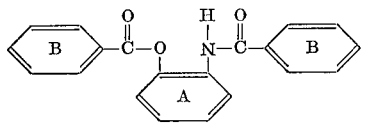

wherein
  ring A is unsubstituted or substituted by a single chloro; and
  ring B is substittued by one or two members selected independently from the group consisting of halo having an atomic weight of from 19 to 35.

38. The compound according to claim 37 which is 3,4-dichlorobenzoate ester of o-(3,4-dichlorobenzamido)-phenol.

39. A non-toxic pharmaceutically acceptable salt of a compound according to claim 2.

References Cited

UNITED STATES PATENTS 2,964,494  12/1960  Lappin et al. _____ 260—558

LORRAINE A. WEINBERGER, Primary Examiner

L. A. THAXTON, Assistant Examiner

U.S. Cl. X.R.

260—470, 477, 501.11, 509, 519, 558, 559, 562; 424—319